UNITED STATES PATENT OFFICE.

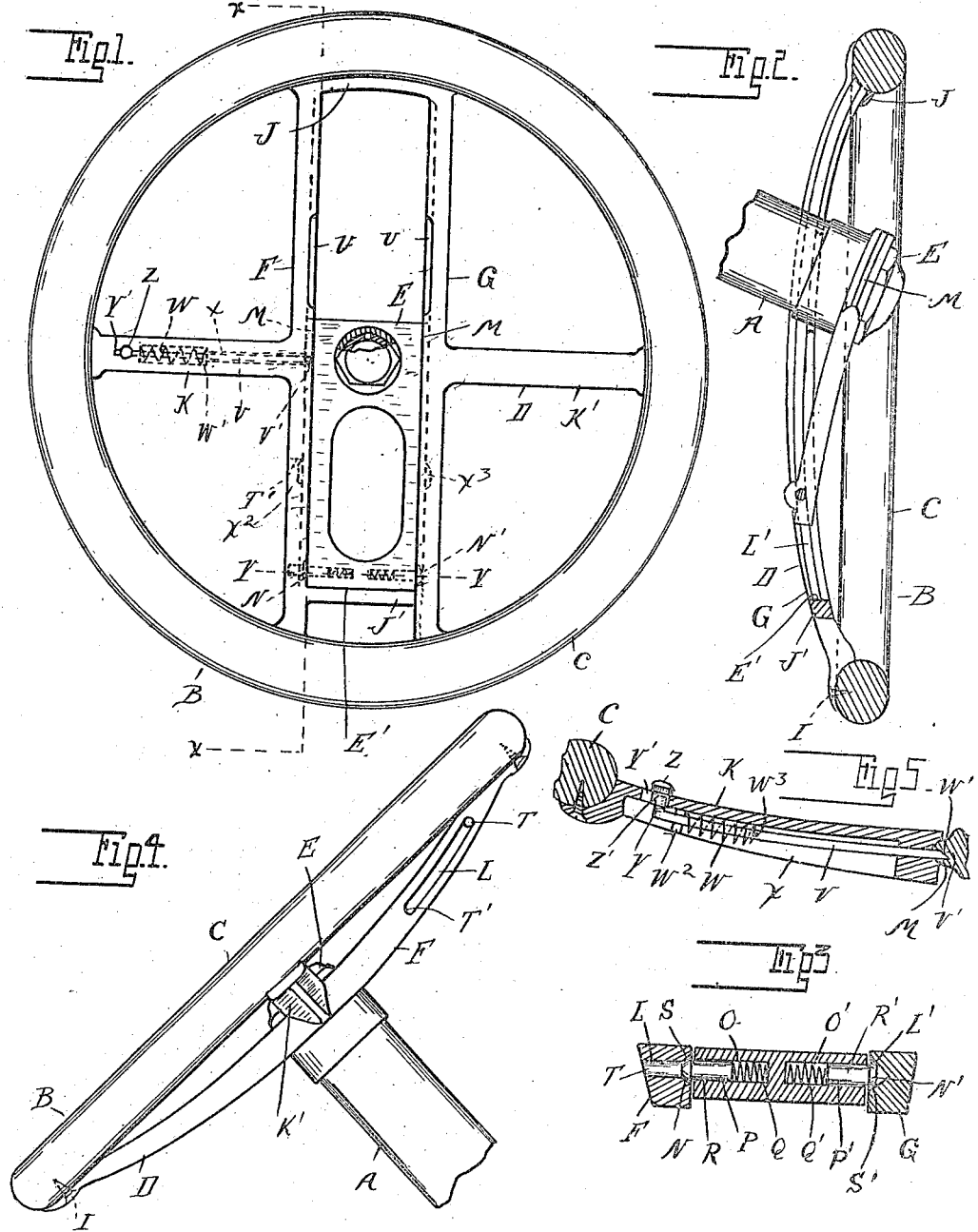

ASA G. NEVILLE, OF WELLSBURG, WEST VIRGINIA.

STEERING-WHEEL.

1,239,943. Specification of Letters Patent. Patented Sept. 11, 1917.

Application filed March 18, 1916. Serial No. 85,038.

*To all whom it may concern:*

Be it known that I, ASA G. NEVILLE, a citizen of the United States of America, residing at Wellsburg, in the county of Brooke and State of West Virginia, have invented certain new and useful Improvements in Steering-Wheels, of which the following is a specification, reference being had therein to the accompanying drawings.

This invention relates to steering wheels such as are employed for governing the direction of travel of an automobile, boat, or other vehicle, and refers more particularly to that type of steering wheels in which the rim portion while in use is substantially concentric with the steering post, and held in rigid relation thereto, but which can be easily adjusted to a position eccentric to or at one side of the steering post.

In steering wheels such as are employed in automobiles, motor boats, aeroplanes, or other traveling devices it is desirable that the steering wheel extend relatively close to the seat. While the location of the wheel in close proximity to the driver's seat makes it convenient for use, such location, however, proves a hindrance in entering and leaving the vehicle, and it is one of the objects of the present invention to provide an improved construction which will permit the steering wheel to be conveniently positioned for use, and easily adjusted out of the path of the driver in entering and leaving the vehicle.

Other objects of the invention are to provide a construction in which the steering wheel is adjustable to an inoperative position by both a sliding and rocking motion, to provide a construction in which there is a sufficient bearing surface or spaced bearing surfaces between the stationary and movable parts of the wheel, to give a rigid connection between the post and wheel when the latter is in use; to provide a construction in which the adjustment can be more easily made than with previous devices of this character, the relative movable parts being preferably provided with roller bearings or other anti-friction means, thus avoiding the necessity of any great amount of exertion in adjusting the wheel to or from its operative position.

The invention further resides in the provision of improved and simplified means for locking the wheel in position for use and in the novel arrangement of parts wherein a neat appearing, strong and durable construction of steering mechanism is obtained, and in such details of construction and combinations and arrangements of parts as will more fully hereinafter appear.

In the drawings:

Figure 1 is a top plan view of a steering wheel embodying the invention.

Fig. 2 is a cross-sectional view on the line *x—x* of Fig. 1.

Fig. 3 is a cross-sectional view on the line *y—y* of Fig. 1.

Fig. 4 is a side elevational view, and Fig. 5 is a cross section through one of the spider arms.

Referring in detail to the construction shown in the drawings A designates the steering post, and B the steering wheel which comprises a rim C and supporting spider D, and a head E keyed to the post A relative to which head the spider is movable in the manner hereinafter described in detail.

The spider comprises a pair of spaced parallel arms F and G which are connected at their ends by screws I to the rim, and are also preferably provided with cross rods J and J', the latter of which forms an abutment against which the end of the head rests when the wheel is in position. Transversely extending cross arms K and K' connect the center portion of the spider with the rim, so as to provide a very rigid connection between the rim A and the parallel arms F and G. The latter are provided on their opposed faces with recesses L and L' to receive the bearings M and M' and N and N' carried by the head E at its front and rear ends respectively. The relatively wide spacing between the front and rear bearings of the head gives a sufficiently rigid connection between the latter and the arms F and G without introducing any material frictional resistance to relative movement between the parts.

The rear bearings N and N' also form pivots about which the rim and spider can be rocked, the present invention contemplating a construction in which the wheel is movable to its inoperative position by combined sliding and rocking movement. In this way I am enabled to retain the advantage of the greater rigidity which is obtained in the sliding type of adjustment, and at the same time to facilitate the speed and ease with which the adjustment can be made.

In detail the rear bearing or pivot engagement is as follows:

The end E' of the web portion of the head E and the cross rod J are provided with recesses O and O' forming housings for the ends P and P' of the rollers R and R'. These recesses also receive springs Q and Q' which force the rollers outward so that their beveled surfaces S and S' are spring pressed against the sides or track way of the arms F and G, the tensioning of these members also prevents rattling of the parts. Preferably the arm F is slotted as indicated at L³ to receive the projecting end T of the roller R, the length of the groove being such that its inner end T' acts as a stop for the roller whenever the steering wheel has been adjusted along the head E, a sufficient distance to bring the forward bearings M and M' into registration with the notched-out portions U and U' of the arms F and G.

At this point the wheel is free to swing downward about the rollers R and R' as a pivot, to the position shown in Fig. 2. Therefore in adjusting the wheel to permit free ingress and egress to the driver's seat it is only necessary to shove the wheel back until the bearings M and M' register with the notched-out portions U and U', when the wheel will automatically drop to inoperative position. Sliding of the pivots in this position is prevented by the springs Q and Q' forcing the beveled ends S and S' into the counter-sunk portions X² and X³. Conversely the wheel can be adjusted back to operative position by combined rocking and sliding movement, and when the rim C is again brought into position substantially concentric with the steering post A it is held in rigid relation by a latch V having a beveled end V' yieldably forced by a spring W into engagement with a notch or recess W' in the head E. The spring W acts between the stationary abutment W² on the spider arm and the pin W³ extending through the latch, the abutments being located sufficiently close together to compress the spring and force the latch end V' into the notch W'.

The latch V is preferably located in a channel X formed in the under side of the arm K and has an offset end Y extending up through a slot Y' in the arm K. To facilitate the assembly this offset end Y is screw-threaded to receive the latch operating button Z, which is positioned sufficiently close to the rim C to permit of its being operated by the driver's thumb without releasing his grip upon the steering wheel. The button Z preferably has flat sides Z' which engage the sides of the slot Y' and prevent sidewise turning of the button. The tension of the spring W which is sleeved on the latch V being sufficient to hold the flat sides of the button Z drawn down into engagement with the sides of the slot Y'.

A steering wheel constructed as above described has a very rigid connection with the steering post and can be instantaneously moved out of the way by drawing back the button Z and forcing the wheel forward until the bearings M and M' register with the notched-out portions U and U', after which the wheel swings down out of the way. Moreover a steering wheel constructed in accordance with my invention will have greater rigidity than is possible with the pivoted type of steering wheels previously employed.

Various changes in details of construction can of course be made within the scope of my invention.

What I claim as my invention is:

1. The combination with the steering post, of a head rigidly secured thereto and a steering wheel having spaced supporting arms slidably engaging the head to allow movement of the wheel to an eccentric position, said arms being cut away to permit of a relative rocking movement between said wheel and head upon movement of the former to one side of the latter.

2. The combination with a steering post, of a head non-rotatively secured thereto, a wheel having parallel arms between which said head is engaged, said arms having opposed grooves, the top walls of which are interrupted at opposed points, a pair of slide bearings at each end of the head, the bearings of each pair respectively engaging said grooves, one pair of said bearings establishing a pivotal axis about which the wheel may swing downwardly when the other pair register with the interruptions in the groove walls.

3. The combination with a steering-post, of a head non-rotatively secured thereto, a wheel having parallel arms between which said head is engaged, said arms having opposed grooves and having recesses in said grooves at opposed points, the top walls of the grooves being interrupted at opposed points, spaced pairs of slide bearings carried by the head, the bearings of each pair respectively engaging said grooves, one pair of said bearings being spring-pressed and respectively engageable in said recesses in a position of the wheel eccentric to said post, the other pair of bearings being registrable in said position of the wheel with the interruptions in the walls of the grooves, whereby the engagement of one pair of said bearings in said recesses establishes a pivotal axis for the wheel, and the registration of the other pair of bearings with the interruptions in the groove walls permits the wheel to swing about said axis.

4. The combination with a steering post, of a head non-rotatively secured thereto, a wheel having parallel arms between which said head is engaged, and a spring-pressed bearing for establishing a sliding relation between said head and one of said arms, one of said parts carrying said bearing and the other being formed with a groove in which the bearing is engaged, and being formed with a recess in said groove for receiving the bearing in a position of the wheel eccentric to the post to resist sliding motion of the wheel upon the head.

In testimony whereof I affix my signature.

ASA G. NEVILLE.

Copies of this patent may be obtained for five cents each, by addressing the "Commissioner of Patents, Washington, D. C."